United States Patent
Hashimoto

(10) Patent No.: US 6,611,382 B2
(45) Date of Patent: Aug. 26, 2003

(54) ILLUMINATING APPARATUS

(75) Inventor: Yoshimi Hashimoto, Kyoto (JP)

(73) Assignee: Dainippon Screen Mfg., Co., Ltd., Kyoto (JP)

(*) Notice: Subject to any disclaimer, the term of this patent is extended or adjusted under 35 U.S.C. 154(b) by 0 days.

(21) Appl. No.: 09/940,425

(22) Filed: Aug. 29, 2001

(65) Prior Publication Data

US 2002/0024740 A1 Feb. 28, 2002

(30) Foreign Application Priority Data

Aug. 30, 2000 (JP) ....................... 2000-260075

(51) Int. Cl.⁷ ................... G02B 27/10; G02B 27/30
(52) U.S. Cl. ....................... 359/619; 359/641
(58) Field of Search ................. 359/619, 626, 359/641

(56) References Cited

U.S. PATENT DOCUMENTS

| | | | |
|---|---|---|---|
| 5,386,426 A | * | 1/1995 | Stephens ............... 372/20 |
| 5,521,748 A | | 5/1996 | Sarraf |
| 5,900,981 A | | 5/1999 | Oren et al. |
| 5,923,475 A | | 7/1999 | Kurtz et al. |
| 6,433,934 B1 | * | 8/2002 | Reznichenko et al. ...... 359/622 |

FOREIGN PATENT DOCUMENTS

| | | |
|---|---|---|
| JP | 9-230280 | 9/1997 |
| JP | 10-278345 | 10/1998 |

* cited by examiner

*Primary Examiner*—Ricky Mack
(74) *Attorney, Agent, or Firm*—McDermott, Will & Emery

(57) ABSTRACT

A laser illuminating apparatus for irradiating a linear spatial light modulator comprises a bar laser having a plurality of linearly arranged emitters; a lens array having a plurality of lens units less in number than the emitters and arranged parallel to the direction of arrangement of the emitters, for causing a collimated laser beam incident on the lens units to converge at the final surface of the lens units at least on a plane including the direction of arrangement of the emitters and the optical axis; and optics for creating a superimposed far field pattern, in the direction of arrangement of the emitters, of the laser beams emitted from the bar laser onto the lens array, projecting the far field patterns divided by the lens array onto the illumination area in superimposition, and projecting near field patterns, in the direction perpendicular to the direction of arrangement of the emitters, of the laser beams emitted from the bar laser on the illumination area.

7 Claims, 5 Drawing Sheets

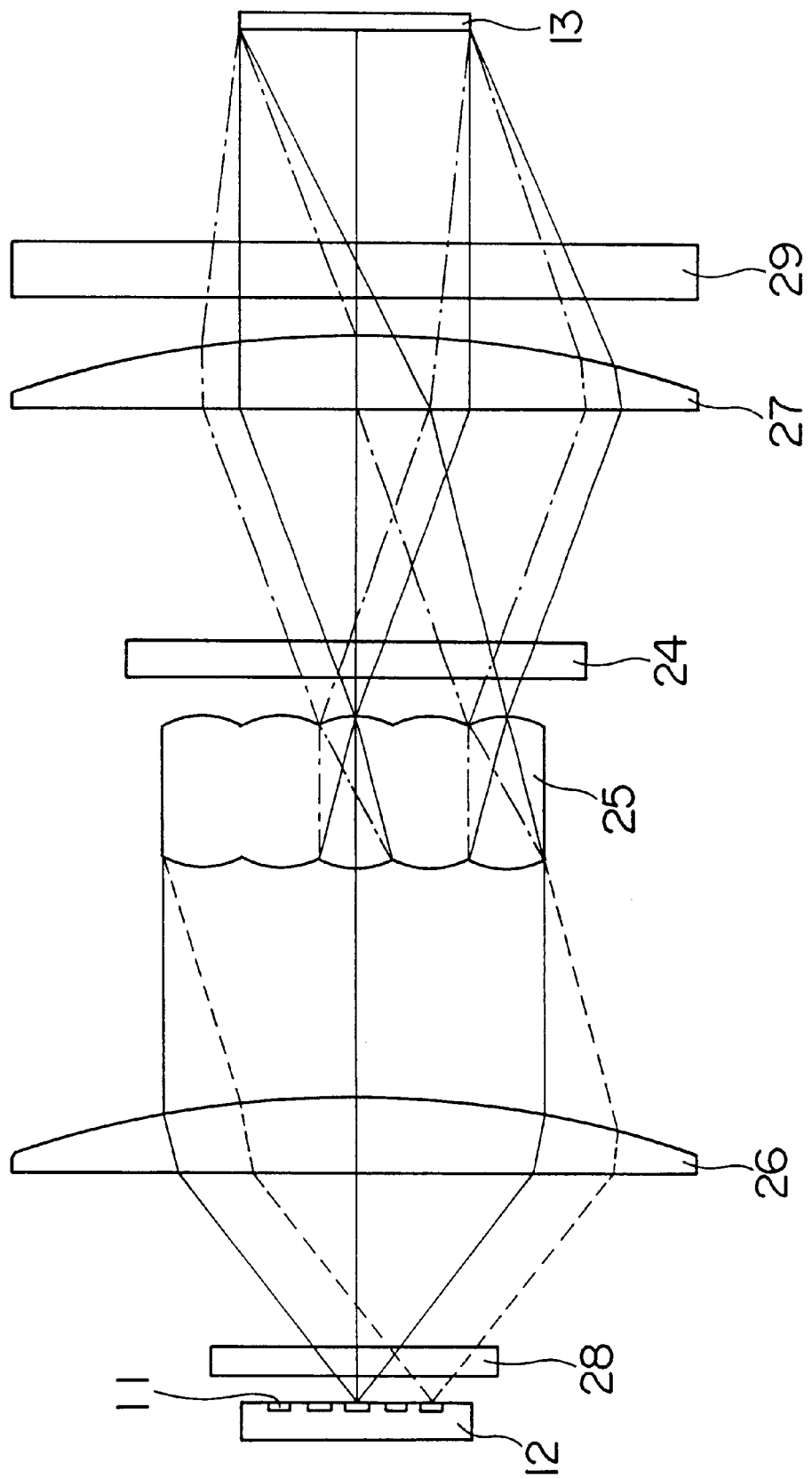
F I G. 4

ILLUMINATING APPARATUS

BACKGROUND OF THE INVENTION

1. Field of the Invention

The present invention relates to a laser illuminating apparatus for irradiating a linear spatial light modulator.

2. Description of the Related Art

Such applications as computer-to-plate and computer-to-press require a high power laser source to expose heat-sensitive material. In such a case, a bar laser (i.e. a broad-area semiconductor laser) including a plurality of emitters arranged linearly for emitting numerous laser beams in which main beams are substantially parallel can be used.

An image recording system proposed heretofore includes such a bar laser and a spatial light modulator. Laser beams emitted from the bar laser are superimposed on the spatial light modulator through a microlens array having a plurality of microlenses arranged in a corresponding relationship to the emitters of the bar laser. The spatial light modulator divides each laser beam into a plurality of laser beams, and modulates these laser beams individually (see Japanese Patent Publication (Unexamined) No. 1997-230280 and U.S. Pat. No. 5,900,981, for example).

With an illuminating apparatus used in such an image recording system, the microlens array consists of a plurality of microlenses arranged in the arrangement of the emitters in the bar laser. This arrangement results in difficulties in adjusting the microlens array as well as increased manufacturing cost. Further, where such a construction is employed, the bar laser can include only around 20 emitters for reasons of manufacturing and adjustment of the microlens array. Thus, it is difficult to use a very high power ($\geq 60$ w) bar laser with more than 20 emitters.

In addition, the illuminating apparatus used in the above image recording system has a construction for imaging near field patterns of the laser beams emitted from the bar laser on the spatial light modulator. The near field patterns being multi-mode, the consequent light distribution on the spatial light modulator tends to be nonuniform and unstable.

On the other hand, Japanese Patent Publication (Unexamined) No. 1998-278345 has proposed an image recording system constructed for superimposing far field patterns of laser beams emitted from a bar laser on a spatial light modulator.

The image recording system according to Japanese Patent Publication (Unexamined) No. 1998-278345 achieves a uniform light distribution. However, the light distribution is not uniform enough.

SUMMARY OF THE INVENTION

The object of the present invention, therefore, is to provide an illuminating apparatus easy to adjust and inexpensive to manufacture even with a bar laser having numerous emitters, and yet capable of irradiating a stable and uniform illumination area.

The above object is fulfilled, according to the present invention, by a laser illuminating apparatus for irradiating a linear spatial light modulator, comprising a bar laser including a plurality of linearly arranged emitters; a lens array consisting of a plurality of lens units less in number than the emitters and arranged parallel to the direction of arrangement of the emitters, for causing a collimated laser beam incident thereon to converge at the final surface of the lens array at least on a plane including the direction of arrangement of the emitters and the optical axis; and optics for creating a superimposed far field patterns, in the direction of arrangement of the emitters, of the laser beams emitted from the bar laser on the first plane of the lens array, projecting the far field patterns divided by the lens array onto the illumination area in superimposition, and projecting near field patterns, in the direction perpendicular to the direction of arrangement of the emitters, of the laser beams emitted from the bar laser on the illumination area in cooperation with the lens array.

In a preferred embodiment of the invention, the lens array comprises a cylindrical lens array, and the optics comprises:

a first cylindrical lens having power in the direction of arrangement of the emitters for creating a superimposed the far field pattern, in the direction of arrangement of the emitters, of the laser beams emitted from the bar laser to the first plane of the lens array, the emitters of the bar laser being disposed in the front focal position of the first cylindrical lens, the cylindrical lens array having a first surface thereof disposed in the back focal position of the first cylindrical lens;

a second cylindrical lens having power in the direction of arrangement of the emitters for projecting the far field patterns divided by the lens array onto the illumination area in superimposition, the cylindrical lens array having a final surface thereof disposed in the front focal position of the second cylindrical lens, and the illumination area being disposed in the back focal position of the second cylindrical lens; and a pair of third cylindrical lenses each having power in the direction perpendicular to the direction of arrangement of the emitters for projecting the near field patterns, in the direction perpendicular to the direction of arrangement of the emitters, on the illumination area.

In another preferred embodiment, the lens array comprises a spherical drum lens array, and the optics comprises:

a first spherical lens for creating a superimposed far field pattern, in the direction of arrangement of the emitters, of the laser beams emitted from the bar laser to the first plane of the lens array, the emitters of the bar laser being disposed in the front focal position of the first spherical lens, the spherical drum lens array having a first surface thereof disposed in the back focal position of the first spherical lens;

a second spherical lens for projecting the far field patterns divided by the lens array onto the illumination area in superimposition, the spherical drum lens array having a final surface thereof disposed in the front focal position of the second spherical lens, and the illumination area being disposed in the back focal position of the second spherical lens; and a plurality of cylindrical lenses each having power in the direction perpendicular to the direction of arrangement of the emitters and projecting the near field patterns in cooperation with the spherical drum lens array and the first and second spherical lenses, in the direction perpendicular to the direction of arrangement of the emitters, on the illumination area.

BRIEF DESCRIPTION OF THE DRAWINGS

FIG. 4 is a top view of an illuminating apparatus in a second embodiment of the invention seen in the direction of a fast axis thereof.

DESCRIPTION OF THE PREFERRED EMBODIMENTS

Figure 1:
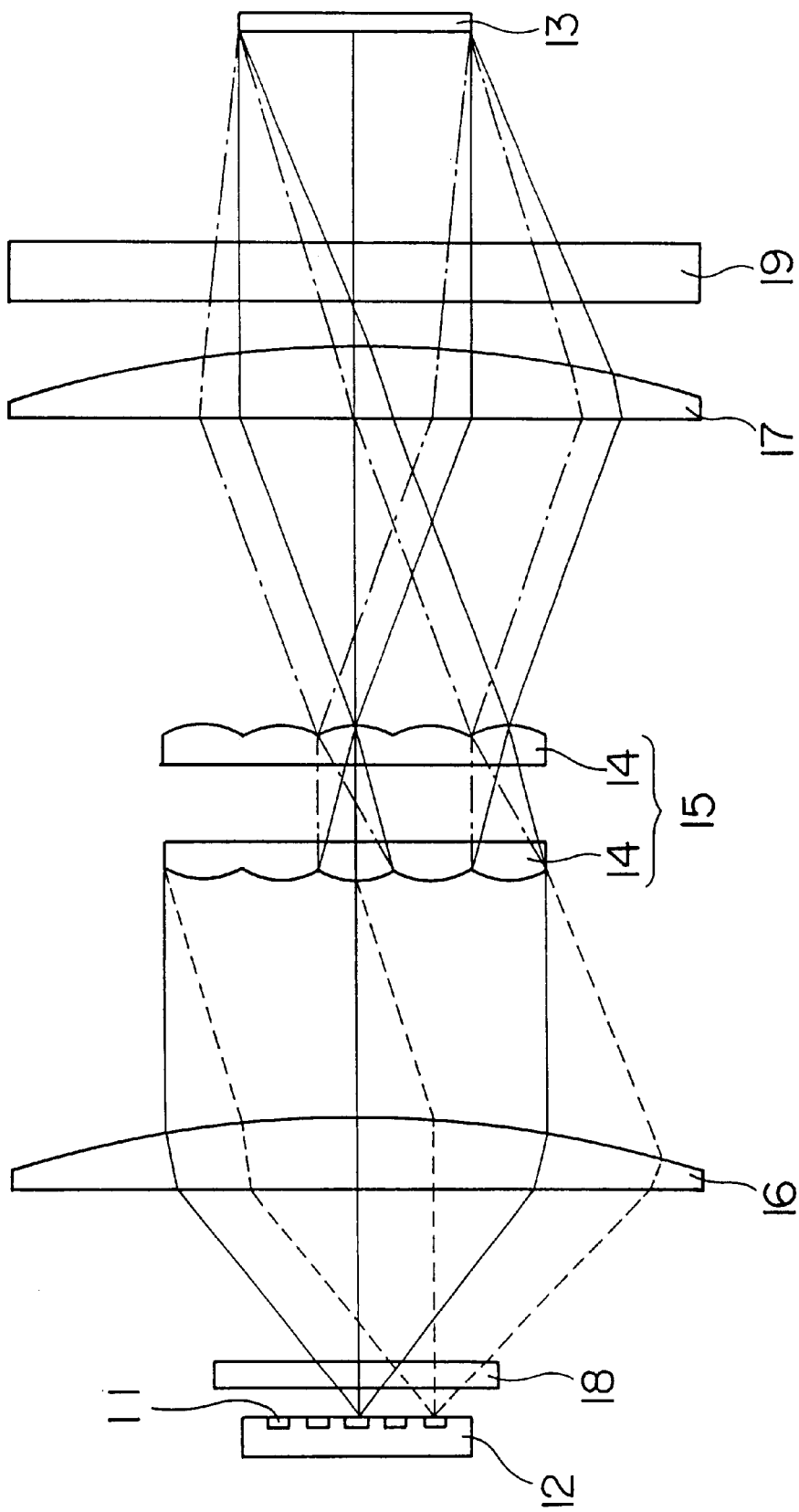
FIG. 1 is a top view of an illuminating apparatus in a first embodiment of the present invention seen in the direction of a fast axis thereof.
Figure 2:
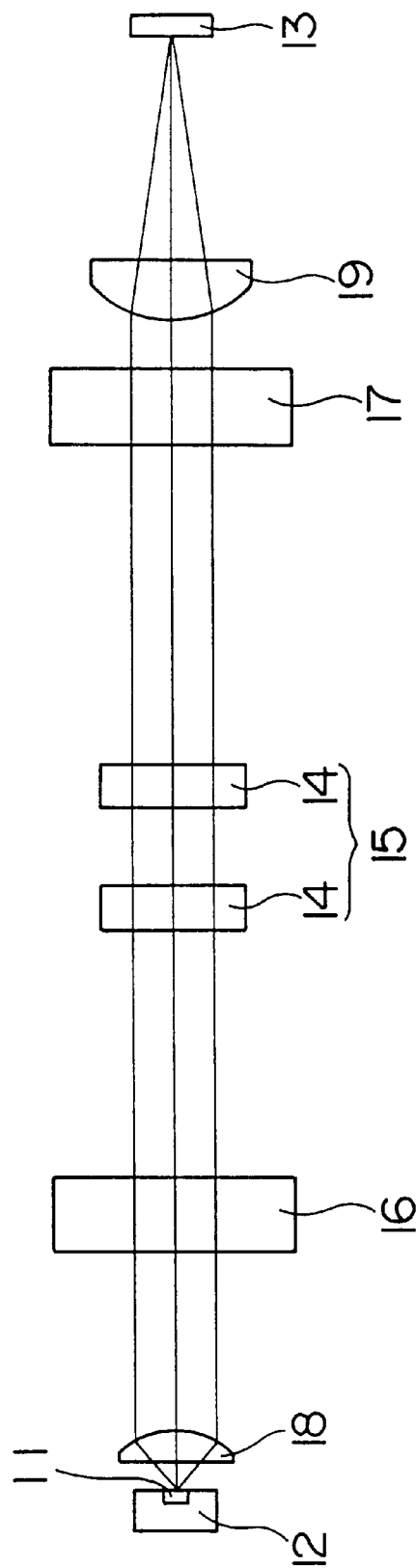
FIG. 2 is a side view of the illuminating apparatus shown in FIG. 1, seen in the direction of a slow axis thereof.

Embodiments of the present invention will be described hereinafter with reference to the accompanying drawings. FIG. 1 is a top view of an illuminating apparatus in the first embodiment of the invention seen in the direction of a fast axis thereof. FIG. 2 is a side view of the illuminating apparatus of FIG. 1 seen in the direction of a slow axis thereof.

The direction of the fast axis is a direction in which laser beam emitted from an emitter of a bar laser 12, which will be described hereinafter, spread out fast, while the direction of the slow axis is a direction in which the laser beams emitted from an emitter of the bar laser 12 spread out slowly. In FIG. 1, the direction perpendicular to the paper is the direction of the fast axis, the vertical direction is the direction of the slow axis, and the horizontal direction is the direction of the optical axis. Similarly, in FIG. 2, the direction perpendicular to the paper is the direction of the slow axis, the vertical direction is the direction of the fast axis, and the horizontal direction is the direction of the optical axis.

The illuminating apparatus according to the present invention is designed for illuminating a linear pixel array of a spatial light modulator 13 with laser beams emitted from the bar laser 12. The apparatus includes a cylindrical lens array 15 having power in the direction of the slow axis, a pair of cylindrical lenses 16 and 17 each having power in the direction of the slow axis, and a pair of cylindrical lenses 18 and 19 each having power in the direction of the fast axis. This illuminating apparatus is used in an image recording system for recording an image on a heat-sensitive material, for example.

The bar laser 12 is a type of semiconductor laser, and includes a plurality of linearly arranged emitters 11. By the way of example, bar laser 12 is B1-83-40C-19-30-A or B1-830-60C-49-50-B manufactured by COHERENT. Such bar lasers have several tens of emitters, but only five emitters 11 are shown in FIG. 1 for simplicity.

The cylindrical lens array 15 is a combination of two cylindrical lens arrays 14. The cylindrical lens array 14 consists of a plurality of lens units fewer in number than that of the emitters 11 and arranged parallel to the direction in which the emitters 11 are arranged of the bar laser 12. A collimated laser beam incident on one of the lens units converges at the final surface thereof on a plane including the direction of arrangement of the emitters and the optical axis.

The cylindrical lens 16 having power in the direction of the slow axis is used for creating a superimposed far field pattern, in the direction of arrangement of the emitters 11 (i.e. in the direction of the slow axis), of the laser beams emitted from the emitters 11 on the first plane of the cylindrical lens array 15. The emitters 11 of the bar laser 12 are disposed in the front focal position of the cylindrical lens 16, while the first surface of the cylindrical lens array 15 is disposed in the back focal position thereof. The cylindrical lens 17 having power in the direction of the slow axis is used for projecting the far field pattern of each laser beam divided by the cylindrical lens array 15 in superimposition to the linear spatial light modulator 13. The final surface of the cylindrical lens array 15 is disposed in the front focal position of the cylindrical lens 17, while the spatial light modulator 13 is disposed in the back focal position thereof.

The pair of cylindrical lenses 18 and 19 each having power in the direction of the fast axis are used for imaging near field patterns, in the direction (i.e. the direction of the fast axis) perpendicular to the direction of arrangement of the emitters 11, of the laser beams emitted from the emitters 11 of the bar laser 12 on the linear spatial light modulator 13.

The spatial light modulator 13 is used for dividing each laser beam incident on the linear illumination area on the surface thereof into a plurality of laser beams, and for modulating these laser beams individually in response to image signals. The laser beams modulated by the spatial light modulator 13 irradiate an image recording medium through an imaging optics not shown. A preferred spatial light modulator 13 is Grating Light Valve (trademark), also known as GLV, manufactured by SILICON LIGHT MACHINES, U.S.A.

With the illuminating apparatus having the above construction, the laser beams emitted from the emitters 11 of the bar laser 12 enter the cylindrical lens array 15 after collimated in the slow axis and fast axis directions by the cylindrical lenses 16 and 18 respectively. Each laser beam is divided by the cylindrical lens array 15 and is superimposed on the linear illumination area of spatial light modulator 13.

FIG. 3 shows laser beam distributions right before entering the cylindrical lens array 15 and on the spatial light modulator 13.

Figure 3A:
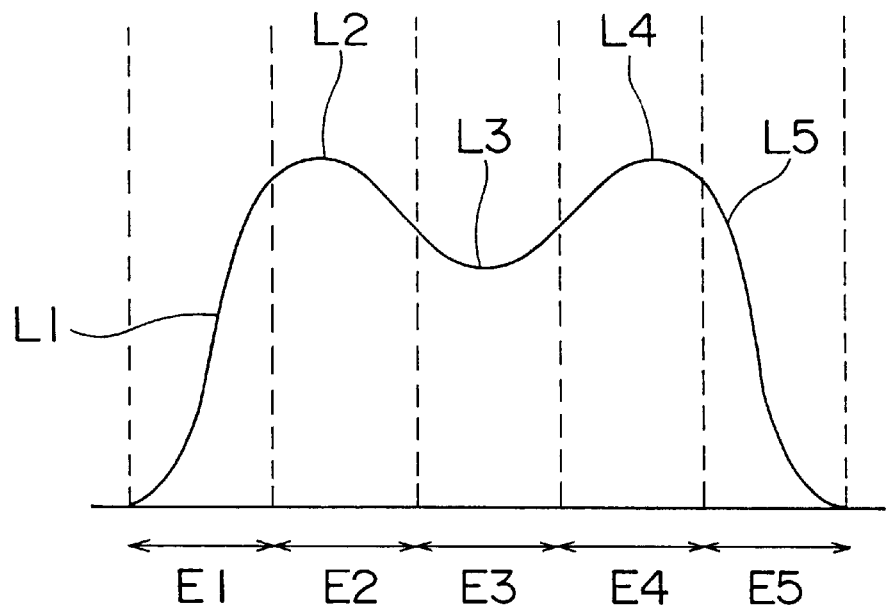
FIG. 3A is a view showing a laser beam distributions on the first plane of a cylindrical lens array.
Figure 3B:
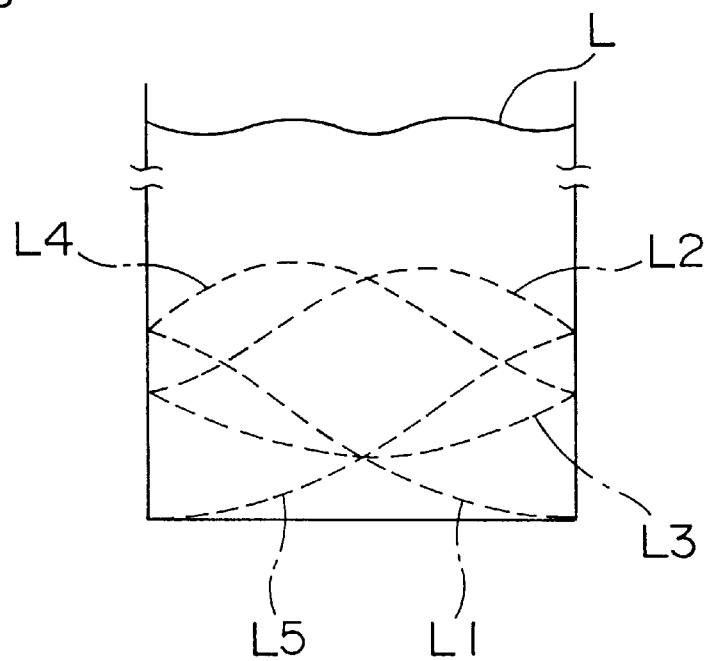
FIG. 3B is a view showing a superimposed beam distribution on a surface of a spatial light modulator.

As seen in FIG. 3A, each laser beam incident on the cylindrical lens array 15 is divided by the five lens units constituting the cylindrical lens array 15 into laser beams L1, L2, L3, L4 and L5 having different intensity profiles in five areas E1, E2, E3, E4 and E5, respectively. As shown in FIG. 3B, these leaser beams L1, L2, L3, L4 and L5 are superimposed on the linear illumination area on the spatial light modulator 13, thereby to form a laser beam L having a substantially uniform distribution.

Consequently, the linear illumination area on the spatial light modulator 13 is irradiated by a stable and uniform laser beam. In addition, such uniformity is substantially immune to failure of one of the emitters 11. The position of the cylindrical lens array 15 may be adjusted far more easily than that of the microlens array used in the prior art.

In the above embodiment, each cylindrical lens array 14 consists on five lens units. Increase in the number of lens units tends to make greater part of beam energy incident on each lens unit penetrate the adjacent lens units resulting in loss of energy on the spatial light modulator. On the other hand, decrease in the number of lens units may fail to give a sufficient uniformity. Thus, the number of lens units should be between three and ten.

Figure 5:
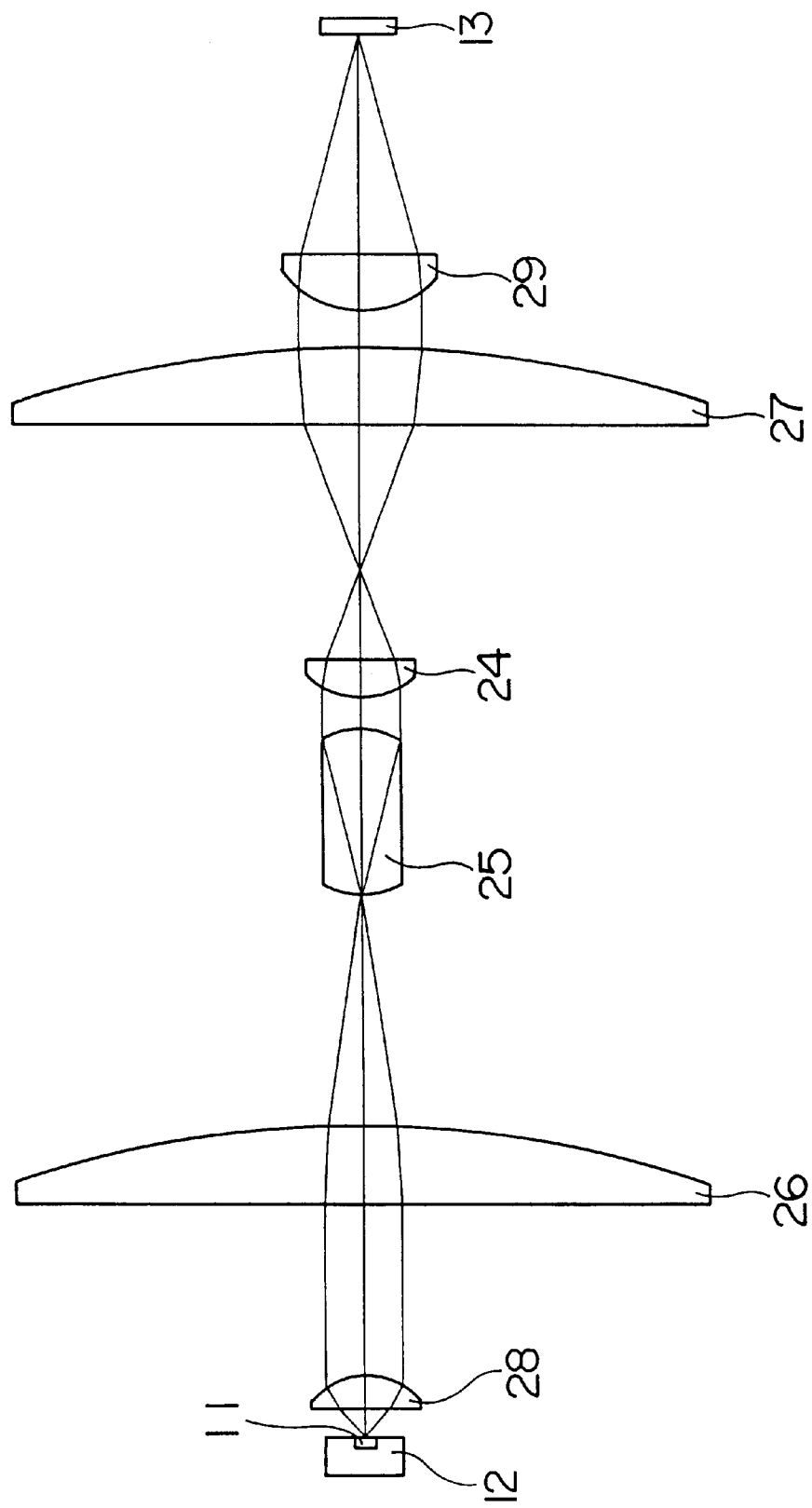
FIG. 5 is a side view of the illuminating apparatus shown in FIG. 4, seen in the direction of a slow axis thereof.

Another embodiment of the present invention will be described next. FIG. 4 is a top view of an illuminating apparatus in a second embodiment of the invention seen in the direction of a fast axis thereof. FIG. 5 is a side view of the illuminating apparatus of FIG. 4 seen in the direction of a slow axis thereof.

In FIG. 4, as in FIG. 1, the direction perpendicular to the paper is the direction of the fast axis, the vertical direction is the direction of the slow axis, and the horizontal direction is the direction of the optical axis. In FIG. 5, as in FIG. 2, the direction perpendicular to the paper is the direction of the slow axis, the vertical direction is the direction of the fast axis, and the horizontal direction is the direction of the optical axis.

The illuminating apparatus in the second embodiment of the invention is designed for illuminating a linear pixel array of the spatial light modulator 13 with laser beams emitted from a bar laser 12, and includes a spherical drum lens array 25, a pair of spherical lenses 26 and 27, and three cylindrical lenses 24, 28 and 29 each having power in the direction of the fast axis.

The spherical drum lens array 25 consists of a plurality of lens units fewer in number than that of the emitters 11 and arranged parallel to the direction of arrangement of emitters 11 of the bar laser 12. A collimated laser beam on one of the lens units converges at the final surface thereof. In the second embodiment as well, the spherical drum lens array 25 consists of five lens units.

In the illuminating apparatus in the first embodiment described herein-before has the cylindrical lens array 15 and the pair of cylindrical lenses 16 and 17 each having power in the direction of the slow axis and the pair of cylindrical lenses 18 and 19 each having power in the direction of the fast axis. By contrast, the illuminating apparatus in the second embodiment employs the spherical drum lens array 25 and the pair of spherical lenses 26 and 27 acting on both directions.

With the emitters 11 of the bar laser 12 disposed in the front focal position of the spherical lens 26, and the first surface of the spherical drum lens array 25 disposed in the back focal position thereof, the far field patterns, in the direction of arrangement of the emitters 11 (in the direction of the slow axis), of the laser beams emitted from the emitters 11 of the bar laser 12 are superimposed on the first plane of the spherical drum lens array 25. Each of the far field patterns is divided by the spherical drum lens array 25. The far field patterns of the laser beams divided by the spherical drum lens array 25 are projected as superimposed to the linear spatial light modulator 13 by the action of spherical lens 27. The final surface of the spherical drum lens array 25 is disposed in the front focal position of the spherical lens 27, while the spatial light modulator 13 is disposed in the back focal position of the spherical lens 27.

On the other hand, the near field patterns, in the direction (direction of the fast axis) perpendicular to the direction of arrangement of the emitters 11, of the laser beams emitted from the emitters 11 of the bar laser 12 are superimposed on the linear spatial light modulator 13 by the spherical drum lens array 25, the pair of spherical lenses 26 and 27, and the three cylindrical lenses 24, 28 and 29 each having power in the direction of the fast axis.

In the other words, the near field patterns of the laser beams, in the direction (direction of the fast axis) perpendicular to the direction of arrangement of the emitters 11, emitted from the respective emitters 11 of the bar laser 12 are projected onto the first surface of the spherical drum lens array 25 by the cylindrical lens 28 and the spherical lens 26 both having power in the direction of the fast axis. Then an intermediate image is generated between the cylindrical lens 24 and spherical lens 27 by the spherical drum lens array 25 and cylindrical lens 24 having power in the direction of the fast axis. Subsequently, the near field patterns are projected onto the linear spatial light modulator 13 by the action of the spherical lens 27 and cylindrical lens 29 having power in the direction of the fast axis.

With the illuminating apparatus having the above construction, as with the illuminating apparatus in the first embodiment, the linear illumination area on the spatial light modulator 13 is irradiated by a stable and uniform laser beam, and such uniformity is substantially immune to failure of one of the emitters 11. The position of the spherical drum lens array 25 may be adjusted far more easily than the microlens array used in the prior art.

It is preferable that the number of lens units constituting the spherical drum lens array 25 is three to ten for the same reasons set forth with respect to the lens units constituting the cylindrical lens array 15 in the first embodiment.

This application claims priority benefit under 35 U.S.C. Section 119 of Japanese Patent Application No. 2000-260075 filed in the Japanese Patent Office on Aug. 30, 2000, the entire disclosure of which is incorporated herein by reference.

What is claimed is:

1. A laser illuminating apparatus for irradiating a linear spatial light modulator, comprising;
   a bar laser including a plurality of linearly arranged emitters;
   a lens array including a plurality of lens units less in number than said emitters and arranged parallel to the direction of arrangement of said emitters, for causing collimated laser beams incident on said lens units to converge at the final surface of said lens units at least on a plane including said direction of arrangement of said emitters and the optical axis; and
   optics for creating a superimposed far field pattern, in the direction of arrangement of said emitters, of the laser beams emitted from said bar laser onto said lens array, projecting the far field patterns of the laser beams divided by said lens array to said illumination area in superimposition, and projecting near field patterns, in a direction perpendicular to the direction of arrangement of said emitters, of the laser beams emitted from said bar laser on said illumination area in cooperation with said lens array.

2. An illuminating apparatus as defined in claim 1, wherein said lens array is made of a cylindrical lens array, and said optics comprises:
   a first cylindrical lens having power in the direction of arrangement of said emitters for creating a superimposed far field pattern, in the direction of arrangement of said emitters, of the laser beams emitted from said bar laser on said lens array, said emitters of said bar laser being disposed in the front focal position of said first cylindrical lens, said cylindrical lens array having a first surface thereof disposed in the back focal position of said first cylindrical lens;
   a second cylindrical lens having power in the direction of arrangement of said emitters for projecting the far field patterns divided by said lens array onto said illumination area in superimposition, said cylindrical lens array having a final surface thereof disposed in the front focal position of said second cylindrical lens, and said illumination area being disposed in the back focal position of said second cylindrical lens; and
   a pair of third cylindrical lenses each having power in the direction perpendicular to the direction of arrangement of said emitters for imaging the near field patterns, in the direction perpendicular to the direction of arrangement of said emitters, of the laser beams emitted from said bar laser on said illumination area.

3. An illuminating apparatus as defined in claim 2, wherein said cylindrical lens array comprises three to ten cylindrical lens units.

4. An illuminating apparatus as defined in claim 1, wherein said lens array comprises a spherical drum lens array, and said optics comprises:
- a first spherical lens for creating a superimposed far field pattern, in the direction of arrangement of said emitters, of the laser beams emitted from said bar laser to said lens array, said emitters of said bar laser being disposed in the front focal position of said first spherical lens, said spherical drum lens array having a first surface thereof disposed in the back focal position of said first spherical lens;
- a second spherical lens for projecting the far field patterns as divided by said lens array to said illumination area in superimposition, said spherical drum lens array having a final surface thereof disposed in the front focal position of said second spherical lens, and said illumination area being disposed in the back focal position of said second spherical lens; and
- a plurality of cylindrical lenses each having power in the direction perpendicular to the direction of arrangement of said emitters and projecting the near field patterns in cooperation with said spherical drum lens array and said first and second spherical lenses, in the direction perpendicular to the direction of arrangement of said emitters, on said illumination area.

5. An illuminating apparatus as defined in claim 4, wherein said spherical drum lens array comprises three to ten spherical drum lens units.

6. A laser illuminating apparatus for irradiating a linear spatial light modulator, comprising:
- a bar laser including a plurality of linearly arranged emitters;
- a lens array including a plurality of lens units less in number than said emitters and arranged parallel to the direction of arrangement of said emitters, for causing collimated laser beams incident on said lens units to converge at the final surface of said lens units at least on a plane including said direction of arrangement of said emitters and the optical axis;
- lens means for creating a superimposed far field pattern, in the direction of arrangement of said emitters, of the laser beams emitted from said bar laser onto said lens array; and
- lens means for projecting the far field patterns divided by said lens array to said illumination area in superimposition; and
- lens means for projecting near field patterns, in the direction perpendicular to the direction of arrangement of said emitters, of the laser beams emitted from said bar laser on said illumination area in cooperation with said lens array.

7. An illuminating apparatus as defined in claim 6, wherein said lens array comprises three to ten lens units.

* * * * *